Patented Mar. 29, 1949

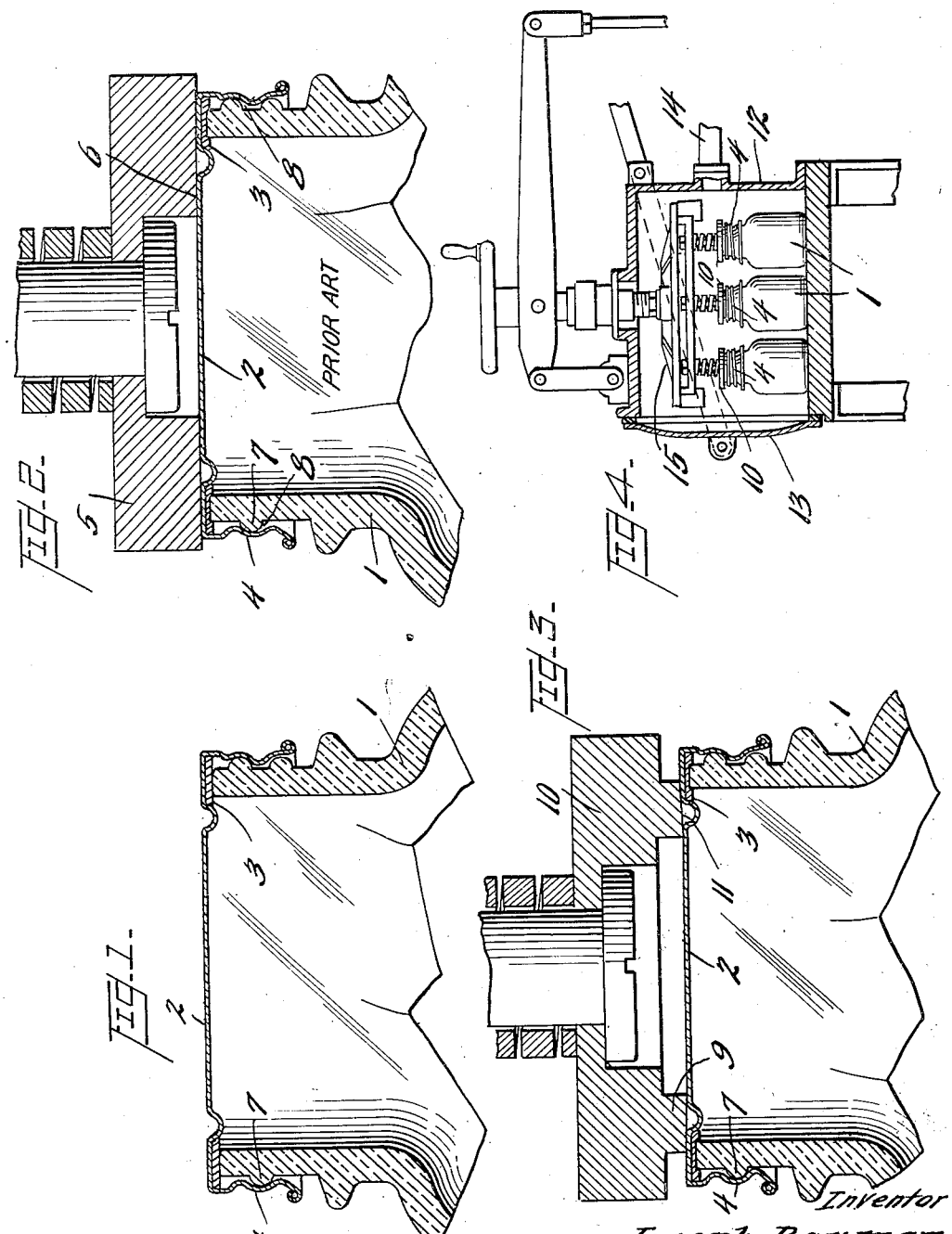

2,465,706

UNITED STATES PATENT OFFICE 2,465,706

PUSH-ON MECHANISM FOR SEALING SCREW CAP CONTAINERS UNDER VACUUM

Joseph Bauman, Wheeling, W. Va., assignor to Hazel-Atlas Glass Company, Wheeling, W. Va., a corporation of West Virginia Application November 3, 1944, Serial No. 561,810

5 Claims. (Cl. 226—82)

The invention relates to improvements in apparatus for sealing containers, particularly glass containers, with screw closures, under vacuum, and one of the objects of the invention is to provide means by which screw cap containers can be rapidly and efficiently vacuumized and sealed by less complex mechanism than has heretofore been possible.

Another object of the invention is to provide means whereby an apparatus designed for vacuumizing and sealing containers with push-on caps can be quickly and easily converted into an apparatus for vacuumizing and sealing containers with screw caps.

A further object of the invention is to provide means by which screw caps can be forced downwardly to sealing position, under vacuum, without deforming the cap skirt or threads, whereby the caps may not require retightening, and if they are retightened there will be no leakage of air into the containers during the retightening operation.

Various other objects and advantages of the invention will be apparent to those skilled in the art from the following detailed description, when taken in connection with the accompanying drawings, in which Figure 1 is a vertical sectional view of a closure screwed on the neck of a glass container, but not sealing the container;

Figure 2 is a vertical sectional view of the closure after it has been forced vertically downward to sealing position by a sealing pad construction heretofore known;

Figure 3 is a vertical sectional view of the closure after it has been forced vertically downward to sealing position in accordance with the present invention; and Figure 4 is a vertical sectional view of a vacuumizer embodying the present invention.

Of course, it is well known to screw caps on containers, by hand or machine, and then vacuumize the containers and, while the containers are under vacuum, screw the caps down to sealing position. But such method of sealing involves rather complex and expensive mechanisms.

When containers are provided with push-on caps, they are sealed under vacuum by merely forcing the caps downwardly to sealing position, without any rotation, and this is done with relatively simple mechanism.

When attempts are made to use the relatively simple vacuumizers for push-on caps for the purpose of forcing screw caps downwardly to sealing position, without rotating the caps, difficulties are encountered which prevent efficient sealing. These difficulties, and the means by which they are overcome by the present invention, will now be described.

Numeral 1 refers to a glass container which is to be sealed by an ordinary screw cap 2, having a sealing gasket 3. In Figure 1 the cap is shown as mounted on the container with the threads 4 of the cap engaging the glass threads of the container, but the cap has not been screwed all the way down to sealing position.

The present invention does not relate to means for rotating the screw cap 2 to sealing position under vacuum, but relates to means for forcing the top of the screw cap vertically downward to sealing position, under vacuum.

Figure 2 illustrates the cap 2 after it has been forced down to sealing position by a sealing pad 5 which is of the ordinary construction used in vacuumizers for push-on caps.

These pads 5, of which there may be any desired number in a vacuumizer, and which may be raised and lowered by any desired means, have a horizontal flat face 6 for engaging the top of caps of the push-on type. This flat face extends to or beyond the periphery of the cap top.

When such sealing pads are employed to force screw caps down to sealing position, the skirt of the cap containing the threads is forced down and the cap is deformed so that the threads 4 are forced away from the glass threads 7, as indicated by numeral 8 in Figure 2.

When the vacuum in the vacuumizer is relieved, the sealing pads lifted, and the containers removed from the vacuumizer, the caps are held in sealing position by atmospheric pressure. But when the caps are now turned to retighten them, the caps immediately change from their deformed shape of Figure 2 to their original shape of Figure 1. This change of shape tends to loosen the cap slightly, thereby permitting the leakage of air into the vacuumized container.

In accordance with the present invention the cap skirt is not deformed and the necessity for retightening is largely eliminated, and if the caps are retightened there is no leakage.

The sealing means of the present invention is illustrated in Figure 3, and instead of the ordinary flat face extending to a point beyond the periphery of the cap, I employ an annular flange or shoulder 9 depending from the sealing pad 10 at a point which is a substantial distance inward of the cap periphery.

Consequently, when the sealing pad 10 is forced downward, only this annular depending flange engages the cap top and forces the cap down to sealing position on the container. But the depending flange engages the cap top, not at the periphery, but at a substantial distance inwardly thereof, and consequently the cap skirt is not forced downwardly and the cap threads are not forced away from the glass threads. On the contrary, the cap skirt and threads remain as they were, with the cap threads engaging the glass threads, and only the top of the cap, inwardly of its periphery, is forced downwardly to effect the seal, as clearly shown in Figure 3.

Also as shown in Figure 3, the face of the annular flange or shoulder 9 is preferably inclined slightly inwardly and downwardly, as indicated by numeral 11, but of course the invention is not limited to any particular shape of the cap engaging means; the essential feature being that, whatever means is employed, it should engage the cap top inwardly of the periphery thereof.

From the above description it will be apparent that when a screw cap is forced downwardly to sealing position, by the novel means described, the cap skirt and threads will not be deformed, resulting in the cap threads being forced away from the glass threads. Consequently, when the vacuum in the vacuumizer is relieved, the sealing pads lifted, and the containers removed from the vacuumizer, they will be properly sealed, and the caps will be held in sealing relation by atmospheric pressure and also by reason of the engagement of the cap threads with the glass threads.

In such circumstances, any retightening of the caps by rotation may be unnecessary, but if retightening by rotation should be desirable, it will be apparent that there will be no spoiling of the vacuum by leakage of air into the container, for in the sealing operation the relation between the cap threads and the glass threads has not been disturbed, and hence when the cap is retightened pressure on the sealing material is retained, thereby preventing the seal from being broken, with the consequent air leakage.

It will also be apparent that any sealing mechanism designed for sealing containers with push-on caps, under vacuum, can be quickly converted to use for sealing containers with screw caps, by merely substituting for the conventional sealing pads, the novel sealing pads of the present invention so constructed that the downward pressure will be exerted inwardly of the periphery of the caps. Thus the relatively simple vacuumizers for push-on caps are enabled to perform the double function of sealing both push-on caps and screw caps, and further, the expense of the relatively complex vacuumizers for sealing screw cap containers by the rotation of the screw caps is avoided.

It will be understood, of course, that the invention is in no manner limited to any particular form or type of vacuumizer, for obviously the novel sealing pad can be used in any vacuum sealing mechanism. Merely for the purpose of illustration, however, there is shown generally, in Figure 4, a sectional view of a portion of a common and well known vacuumizer for push-on caps. The particular construction illustrated is very similar to the vacuumizer shown and described in the patent to Ingram No. 1,624,869, granted April 12, 1927, and no description thereof is necessary, except to say that the containers with screw caps thereon are placed in the sealing box 12, which is then closed by the door 13. Thereafter the sealing box is vacuumized by means of a pipe 14 leading to any desired source of vacuum, and then the sealing head 15, which has been provided with the novel form of sealing pads 10, is lowered to force the screw caps into sealing position, as heretofore described.

Having fully described the invention, what I claim is:

1. Apparatus for vacuum sealing containers with top seal screw caps engaging threads on the containers, including means for vacuumizing the containers, a vertically reciprocable sealing pad associated with said vacuumizing means, and said sealing pad shaped to engage the tops of screw caps beyond the inner circumference of the container neck and only inwardly of the periphery of the caps, whereby the tops of the screw caps are forced vertically downward to sealing position without substantially disturbing the relation between the cap thread and the container thread.

2. Apparatus for vacuum sealing containers with top seal screw caps engaging threads on the containers, including means for vacuumizing the containers, a vertically reciprocable sealing pad associated with said vacuumizing means, and said sealing pad including means for engaging the tops of screw caps beyond the inner circumference of the container neck and only inwardly of the periphery of the caps, whereby the tops of the screw caps are forced vertically downward to sealing position without substantially disturbing the relation between the cap thread and the container thread.

3. Apparatus for vacuum sealing containers with top seal screw caps engaging threads on the containers, including means for vacuumizing the containers, a vertically reciprocable sealing pad associated with said vacuumizing means, and said sealing pad including depending means for engaging the tops of screw caps beyond the inner circumference of the container neck and only inwardly of the periphery of the caps, whereby the tops of the screw caps are forced vertically downward to sealing position without substantially disturbing the relation between the cap thread and the container thread.

4. Apparatus for vacuum sealing containers with top seal screw caps engaging threads on the containers, including means for vacuumizing the containers, a vertically reciprocable, non-rotating sealing pad associated with said vacuumizing means, and said sealing pad including a depending flange for engaging the tops of screw caps, the exterior diameter of said flange being less than the diameter of the screw caps engaged and greater than the inner circumference of the container neck, whereby the tops of the screw caps are forced vertically downward to sealing position without substantially disturbing the relation between the cap thread and the container thread.

5. Apparatus for vacuum sealing containers with top seal screw caps engaging threads on the containers, including means for vacuumizing the containers, a vertically reciprocable, non-rotating sealing pad associated with said vacuumizing means, said sealing pad including a depending flange for engaging the tops of screw caps, the exterior diameter of the flange being less than the diameter of the screw caps engaged and greater than the inner circumference of the container neck, and the lower face of said flange being inclined downwardly and inwardly, whereby the tops of the screw caps are forced vertically downward to sealing position without substantially disturbing the relation between the cap thread and the container thread.

JOSEPH BAUMAN.

REFERENCES CITED

The following references are of record in the file of this patent:

UNITED STATES PATENTS

| Number | Name | Date |
|---|---|---|
| 774,425 | Hicks | Nov. 8, 1904 |
| 1,624,869 | Ingram | Apr. 12, 1927 |
| 1,761,488 | O'Neil | June 3, 1930 |
| 1,855,786 | Anderson | Apr. 26, 1932 |
| 2,106,464 | Meyer | Jan. 25, 1938 |